No. 702,933.                                       Patented June 24, 1902.

T. E. EDWARDS.
MACHINE FOR SEPARATING PLASTIC MATERIALS INTO SHREDS.

(Application filed Jan. 22, 1902.)

(No Model.)

Witnesses:
Philip Blum Jr.
J. B. Davis.

Inventor:
Thomas E. Edwards

THE NORRIS PETERS CO., PHOTO-LITHO., WASHINGTON, D. C.

UNITED STATES PATENT OFFICE.

THOMAS E. EDWARDS, OF ANN ARBOR, MICHIGAN, ASSIGNOR OF ONE-HALF TO G. FRANK ALLMENDINGER, OF ANN ARBOR, MICHIGAN.

MACHINE FOR SEPARATING PLASTIC MATERIALS INTO SHREDS.

SPECIFICATION forming part of Letters Patent No. 702,933, dated June 24, 1902.

Application filed January 22, 1902. Serial No. 90,810. (No model.)

*To all whom it may concern:*

Be it known that I, THOMAS E. EDWARDS, a citizen of the United States, residing at Ann Arbor, in the county of Washtenaw and State of Michigan, have invented a new and useful Improvement in Machines for Separating Plastic Materials into Shreds, of which the following is a specification.

My invention relates to machines for shredding plastic material by pressing it into grooves; and the objects of my invention are, first, to provide a moving linked belt with a grooved surface; second, to operate against the grooved surface of said belt a smooth-surfaced roll, and, third, to afford facilities for adjusting the pressure between said belt and roll. I attain these objects by a mechanism the principal parts of which are illustrated in the accompanying drawings, in which—

Figure 1:
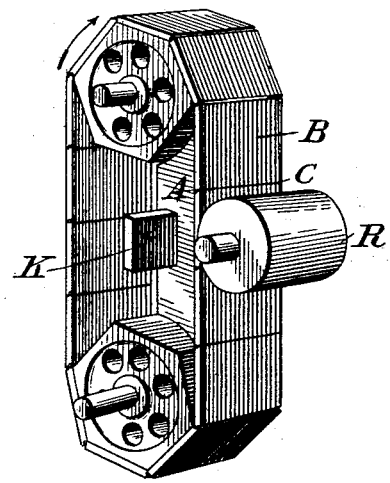
Figure 2:
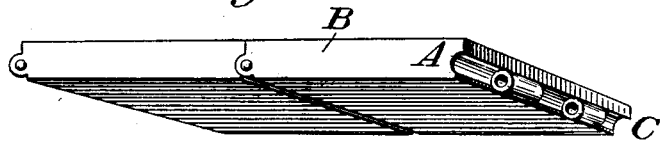
Figure 3:
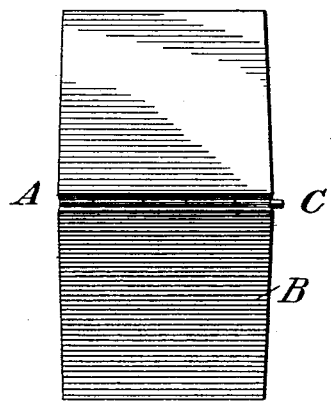

Figure 1 exhibits the principal parts referred to in a working position. Figs. 2 and 3 show details of the linked belt. These drawings are perspective sketches. Frames, gears, belts, levers, and nearly all customary elements of ordinary mechanism are omitted in order to exhibit the essential parts of my invention plainly.

Similar letters refer to similar parts throughout the several views.

In Fig. 1 the grooved linked belt B, running with the same surface speed as the smooth roll R, is kept to its duty by the presser K. Any customary mechanism may be used for this purpose. The presser K being suitably adjusted and the linked belt B and roll R set in motion, a plastic material properly fed to the roll R and linked belt B passes between them, being pressed into the grooves in the belt B. After passing the roll R the grooves of the belt B may be delivered of the divided or shredded material by any suitable mechanism.

Figs. 2 and 3 show the details of the hinged connections A C of the parts of the linked belt B, by means of which the grooves in the separate parts are kept in line.

I am aware that prior to my invention machines have been made for shredding plastic materials of some kinds by pressing them into grooves. I therefore do not claim to be the inventor of the first machine to do such work; but What I do claim as my invention, and desire to secure by Letters Patent, is—

A grooved linked belt with hinged joints A C to keep the units of said belt accurately in line, the units being faced on both sides so that when joined to form a linked belt this belt will follow a plane surface on either or both of its sides, combined with a presser K, to hold said belt to its work, and a smooth roller, R, in the manner described, for the purpose of shredding plastic materials by pressing them into the grooves in said belt, all substantially as set forth.

THOMAS E. EDWARDS.

In presence of—
PHILIP BLUM, Jr.,
J. B. DAVIS.